(12) United States Patent
Khermosh et al.

(10) Patent No.: US 11,716,257 B1
(45) Date of Patent: Aug. 1, 2023

(54) BATCHING OF ARTIFICIAL INTELLIGENCE JOBS

(71) Applicant: NeuReality LTD., Caesarea (IL)

(72) Inventors: Lior Khermosh, Givatayim (IL); Udi Sivan, Zikhron Yaakov (IL)

(73) Assignee: NEUREALITY LTD., Caesarea (IL)

( * ) Notice: Subject to any disclaimer, the term of this patent is extended or adjusted under 35 U.S.C. 154(b) by 0 days.

(21) Appl. No.: 17/664,544

(22) Filed: May 23, 2022

Related U.S. Application Data

(60) Provisional application No. 63/192,328, filed on May 24, 2021.

(51) Int. Cl.
*G06F 15/173* (2006.01)
*H04L 41/5019* (2022.01)
*H04L 41/0897* (2022.01)
*H04L 41/16* (2022.01)
*H04L 41/50* (2022.01)

(52) U.S. Cl.
CPC ...... *H04L 41/5019* (2013.01); *H04L 41/0897* (2022.05); *H04L 41/16* (2013.01); *H04L 41/5096* (2013.01)

(58) Field of Classification Search
CPC . H04L 41/5019; H04L 41/0897; H04L 41/16; H04L 41/5096
USPC .................................................. 709/224–225
See application file for complete search history.

(56) References Cited

U.S. PATENT DOCUMENTS

| | | | | |
|---|---|---|---|---|
| 6,584,467 | B1 * | 6/2003 | Haught | G06Q 40/08 709/200 |
| 10,769,533 | B2 * | 9/2020 | Fougner | G06N 3/08 |
| 10,846,096 | B1 * | 11/2020 | Chung | G06N 20/00 |
| 2019/0253488 | A1 * | 8/2019 | Gokavarapu | H04L 67/566 |
| 2019/0394096 | A1 * | 12/2019 | Bernat | G06F 9/4862 |
| 2021/0357780 | A1 * | 11/2021 | Ji | G06N 5/04 |

* cited by examiner

*Primary Examiner* — Duyen M Doan
(74) *Attorney, Agent, or Firm* — M&B IP Analysts, LLC

(57) ABSTRACT

A method and server for batching execution of artificial inelegance (AI) jobs are provided. The method includes receiving, by an AI server, a plurality of AI jobs from a plurality of clients connected to an AI appliance over a network; for each AI job of the plurality of AI jobs: deriving at least one attribute of the received AI job; determining based on the at least one AI job attribute and at least one batching parameter if the received AI job is a candidate for batching; aggregating the received AI job into a created batch when the received AI job is determined to be a candidate for batching; continuing aggregating newly received AI jobs determined to be candidates for batching in the created batch until at least one service parameter is met; and sending the batch of AI jobs to a compute engine dedicated to executing the batch.

27 Claims, 4 Drawing Sheets

BATCHING OF ARTIFICIAL INTELLIGENCE JOBS

CROSS-REFERENCE TO RELATED APPLICATIONS

This application claims the benefit of U.S. Provisional Application No. 63/192,328 filed on May 24, 2021, the contents of which are hereby incorporated by reference.

TECHNICAL FIELD

The disclosure generally relates to system architectures that allow virtualization of artificial intelligence (AI) resources and, specifically, the batching of AI jobs.

BACKGROUND

Current computing requirements include increasing demands for artificial intelligence (AI) processing systems and AI computing power, which efficiently support high-demand processing. These needs and demands are due in part to the increased popularity of machine learning and AI applications. Such applications are executed by servers configured as dedicated AI servers or AI appliances.

One processing technique to accelerate the execution of AI jobs is known as "batching." Conventional batching processors are designed to aggregate data, store the aggregated data, and process that aggregated data as a batch. The batching is performed to improve efficiency, for instance, to save energy. Typically, batching of AI jobs is performed in AI training and inference operation, where multiple user data sets are aggregated and processed together through the AI-computing pipeline.

Batching allows the computing system to execute more efficiently than the same AI model (layer) can be executed on multiple datasets, thereby reducing the bandwidth of computing neural networks weights for computing and holding more efficient data structures and efficiency of such datasets. The batching of AI jobs further reduces memory usage and improves communication among computing cores and memory sharing.

Typically, virtualization allows partitioning, allocating, and provisioning of a physical resource as multiple virtual (logical) instances which are fully isolated from each other. Further, such instances do not interfere with each other and can consume a portion of allocated physical resources in a concise, no-interference operation. This can be performed while reflecting the consuming element or the running program, a comprehensive logical entity standing alone, which does not require any effort or change from the consuming element to support virtualization.

While the related art suggests some solutions for batching AI jobs, such solutions are limited to systematic batching AI jobs by a single physical resource (e.g., a CPU (Central Processing Unit)) using datasets provided from a single client (AI application). This is a limiting factor, as multiple clients may process the same AI model, which is, by current solutions, processed independently by different accelerators. As such, the efficiency of a system processing AI jobs is significantly reduced. Therefore, the systematic batching of AI jobs requested for execution by multiple clients over multiple accelerators is not feasible today.

It would be, therefore, advantageous to provide an AI acceleration solution that would overcome the deficiencies mentioned above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for batching execution of artificial inelegance (AI) jobs, comprising: receiving, by an AI server, a plurality of AI jobs from a plurality of clients connected to an AI appliance over a network; for each AI job of the plurality of AI jobs: deriving at least one attribute of the received AI job; determining based on the at least one AI job attribute and at least one batching parameter if the received AI job is a candidate for batching; aggregating the received AI job into a created batch when the received AI job is determined to be a candidate for batching; continuing aggregating newly received AI jobs determined to be candidates for batching in the created batch until at least one service parameter is met; and sending the batch of AI jobs to a compute engine dedicated to executing the batch, thereby allowing batching of AI jobs received from a plurality of AI jobs.

Certain embodiments disclosed herein include a server for batching execution of artificial inelegance (AI) jobs. The system comprises a processing circuitry; and a memory, the memory containing instructions that, when executed by the processing circuitry, configure the server to: receiving a plurality of AI jobs from a plurality of clients connected to an AI appliance over a network; for each AI job of the plurality of AI jobs: deriving at least one attribute of the received AI job; determining based on the at least one AI job attribute and at least one batching parameter if the received AI job is a candidate for batching; aggregating the received AI job into a created batch when the received AI job is determined to be a candidate for batching; continuing aggregating newly received AI jobs determined to be candidates for batching in the created batch until at least one service parameter is met; and sending the batch of AI jobs to a compute engine dedicated to executing the batch, thereby allowing batching of AI jobs received from a plurality of AI jobs.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
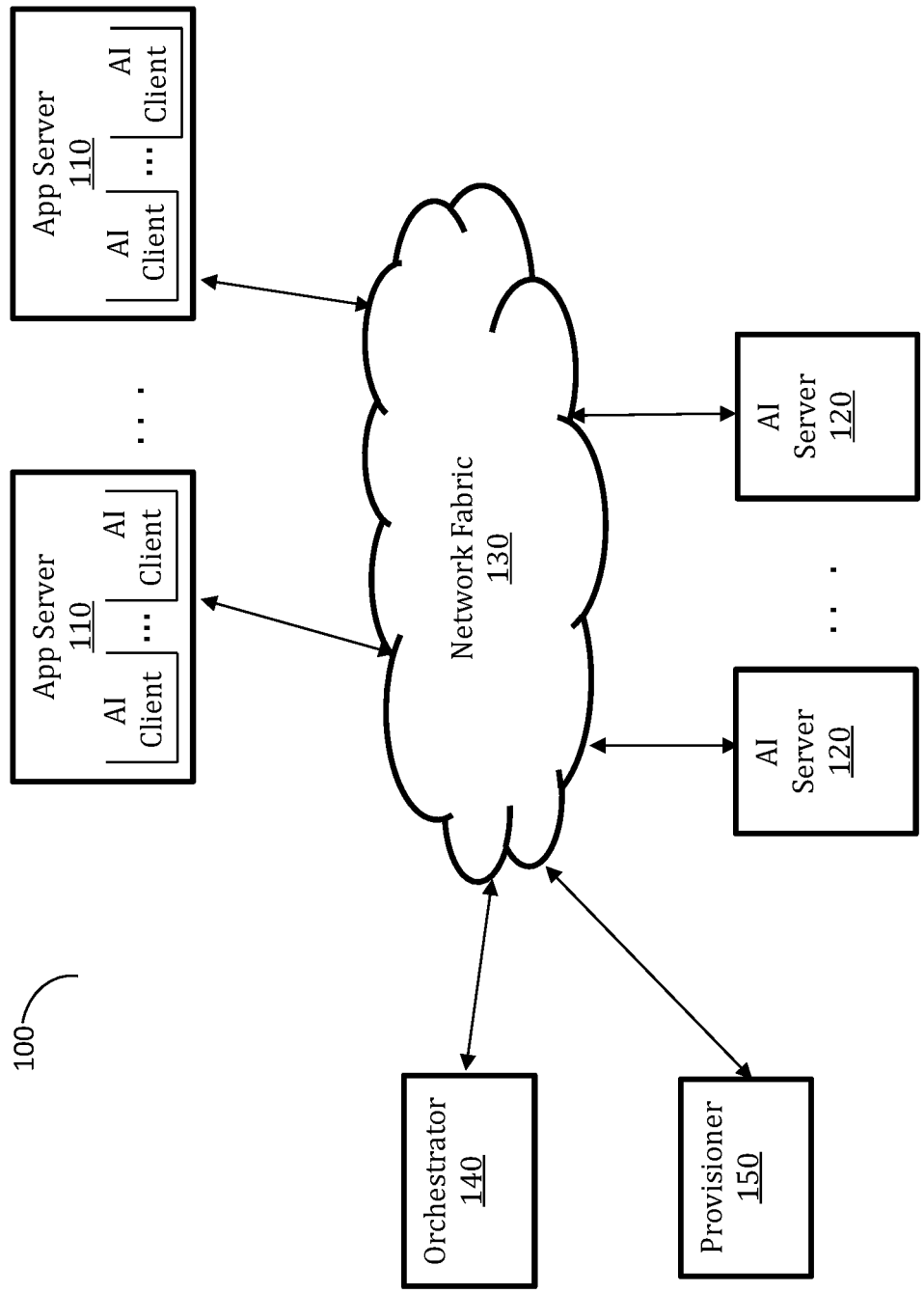
FIG. 1 is a schematic diagram of an AI network utilized to describe the various embodiments.

The embodiments disclosed by the invention are only examples of the many possible advantageous uses and implementations of the innovative teachings presented herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments allow for the batching of AI jobs by a disaggregated AI server. In an embodiment, such an AI server is configured to serve multiple clients together, gather similar AI jobs, and execute such jobs in a batch, even if the aggregated jobs belong to different clients. To allow efficient batching, aggregated jobs from different clients share the same AI model, layer, graph, and the like for execution. The data of such AI jobs is gathered to allow for efficient processing by one or more AI computer engines assigned to process the batch. That is, the disclosed AI server is configured to create batches of AI jobs to optimize the performance of AI compute engines by increasing the average throughput and reducing their average latency. The AI server is further configured to assemble the AI job's data seamlessly to the clients, disassemble the processed batch, and send the respective response back to each client. In an embodiment, AI jobs are added to existing batches, such that the latency of processing the batch, and, hence, each job, is below a predefined time period. In yet another embodiment, the size of each batch is determined by a predefined parameter of maximum batch size.

Batching, as disclosed herein, may include batching of AI jobs or portion thereof (i.e., batching of a specific stage of AI job) based on one or more batching criteria/parameters (hereinafter "batching parameters" or "batching parameter"). The batching parameter may include one or any combination of: a type of an AI job, a compute (computing) engine type that can process the job, a QoS level or latency category, a security level, a job size (input size or output size).

The batching parameter may also include the transient conditions of the client, the transient conditions of the server and other transient conditions, or any other parameter that can be used, for instance, to optimize the performance of the client and/or of the server compute engines and other system engines (e.g., AIoF or AI Hypervisor) or the data transport and communication, internally at the server, or at the client, or between the server and client or all, or to optimized memory bandwidth, or 10 (input/output) operation at the server or the client. The selection of jobs to be batched may be dynamic. That, selecting what jobs to batch and what is the batch (size, timeout, priority) is dynamically based on the batching parameters and what jobs are prohibited from batching.

FIG. 1 shows an example schematic diagram of an AI network 100 utilized to describe the various embodiments. A plurality of application servers 110 configured to execute one or more applications (not shown) that require AI computation tasks. The application servers 110 utilize services provided by the plurality of AI servers 120. Thus, the application servers 110 are clients, and the AI servers 120 are AI resources to execute the AI computation tasks (or AI jobs).

Typically, an AI server 120 includes AI compute engines (not shown in FIG. 1), which are hardware accelerators designed to accelerate the execution of an AI task, job, or function. An AI server 120 includes registers, memories, caches, queues, tables input/output (I/O), storage, and more peripherals utilized by the AI resource.

An AI task, function, or job (collectively referred to as an AI job) may include machine learning, deep learning, neural network processing tasks, and pre-processing and post-processing of tasks for various AI applications. Examples for an AI job include natural language processing (NLP), voice processing, image processing, video processing, recommendation systems, and data analysis with various usage models, for example, recommendation, classification, prediction, and detection. In addition, tasks may also include pre-processing and post-processing computation, for example: image (jpeg) decoding, non-maximum suppression (NMS), after object detection, and the like.

The servers 110 and 120 are connected over a network fabric 130 and communicate over a communication protocol, such as an Ethernet, an InfiniBand, and the like. In an example embodiment, an AI-over-Fabric (AIoF) protocol is utilized for communicating between the servers 110 and 120. The AIoF protocol is designed for high performance, low latency, and low overhead connectivity between artificial intelligence (AI) compute resources over a highspeed network fabric. The disclosed protocol further allows end-to-end performance assurance, quality of service (QoS), provisioning, and orchestration of the AI services and resources. The AIoF is disclosed in further detail in U.S. patent application Ser. No. 17/387,536, title "COMMUNICATION PROTOCOL, AND A METHOD THEREOF FOR ACCELERATING ARTIFICIAL INTELLIGENCE PROCESSING TASKS," assigned to the common assignee and is hereby incorporated by reference.

An orchestrator 140 is also connected to the network fabric 130. The orchestrator 140 is configured to manage the interconnections and interactions among the AI servers 120 and the application servers 110 and all the peripheral resources, such as network connections and paths to data and storage, and to manage further virtual AI resources instantiated according to the disclosed embodiments. The orchestrator 140 is further configured to expose and control such virtual AI resources. In an example configuration, an example provisioning system 150 is also configured to provision the AI resources by managing and loading/unloading the AI models and pipeline graphs to/from them. The functionality of the provisioning system 150 can be unified with the orchestrator 140 in a single implementation entity.

A virtual instance of an AI resource is created by separating AI compute engines included in the AI server 120. The separation of hardware resources may be in time, domain, or both. For example, registers in the memory can be duplicated and be allocated to a separate virtual AI resource instance. A processor can be separated in time (different processing times are allocated to different instances) or by threads (different threads are allocated to different instances). Such a processor may include, for example, a CPU, a deep neural network processor (DNN), and the like.

The AI server 120 is modified to include at least a sequencer to support the batching and disaggregation. An example block diagram of an AI server 120 is provided in FIG. 2.

According to the disclosed embodiments, an AI server (e.g., 120-1) is configured to receive AI jobs from the application servers 110-1 through 110-n. Each AI job is issued by an AI client 101 in server 110. An AI client may be, for example, an application or service executed by a server 110 that requires processing or computation of AI tasks.

The AI jobs are sent from the application server 110 to the AI server 120 over the network fabric 130. A server 120 receiving an AI job is configured to determine the type of the received job and if said job is a candidate for batching based on the batching parameter. The AI job's type may be determined based on the job's ID or job description designated in the request to process the job. When it is determined that the received job is a candidate for batching, the job is temporarily stored in a memory. In an embodiment, aggregated AI jobs in a batch can also be mixed to be served by different computational graphs. For instance, multiple image processing jobs with a similar pre-processing stage (e.g., JPEG decoding) can be batched to be processed separately by a JPEG decoder processing engine.

The same mechanisms described above to aggregate the batch and disassemble the batch to the jobs may be applied only for a specific processing engine (e.g., JPEG decoder). Jobs can then continue separately or in different batch configurations in the rest of the compute engines. Another example is that for jobs or the same compute graph (or many compute graphs in the general case), a certain engine optimization batch size would have a certain value, and when in the next compute engine in the pipeline, the optimal batch size would be a different value. The server can either work in the common denominator batch or aggregate transiently the jobs before each processing engine according to its relevant optimization.

An AI job is determined to be a candidate for batching based on the batching parameter, examples of which are provided above. In an embodiment, an AI server 120 is further configured to determine if batching a received job or jobs would meet a service parameter. The service parameter may be a combination of: a maximum latency for executing the batch, a maximum batch size, a QoS or SLA parameter, an optimization parameter of the server/client different engines, and the like. If any of the batching parameters are met, the batch (aggregated AI jobs) is retrieved from the memory and sent for processing by the relevant AI compute engines. The AI compute engine may provide acceleration of AI and non-AI compute engines. A timeout mechanism forces the maximum latency.

The results of the processing by the AI compute engines are returned to the respective AI client. To this end, the AI server 120 is configured to maintain a list (or a state machine) mapping a job's ID to the AI client that issued the job. This allows for returning the job's processing results to the respective client. If the jobs are constructed from batches originated in clients 101, then the AI server 120 is configured to return each client 101 its respective batch, according to the original recipe of jobs that constructed the batch.

It should be noted that an AI server can batch AI jobs from AI clients (101) in different application servers (110); otherwise, different AI clients (101) in the same application server (110) can be aggregated. Batching can also aggregate AI jobs that span multiple AI servers, concatenated in any parallelism scheme, such as model parallelism, pipeline parallelism, or data parallelism, with any level of communication between servers to implement or synchronize the batching.

According to the disclosed embodiments, the AI server 120 is configured to provide QoS based on a service level agreement (SLA) defined for each specific type of AI job and/or client. When the SLA is determined for a job type, the consumed AI resources are aggregated and partitioned in consumption between the different clients participating in the batch.

In other embodiments, for security considerations, the AI server 120 is configured to verify batched AI jobs so that such jobs do not interfere with each other when executed by one or more AI compute engines. If a client 101 exceeds its SLA or may be assigned with a certain security level, then the AI server 120 may decide whether to batch the jobs received from client 101. The AI server 120 is also configured to aggregate jobs into a batch according to their security level. For example, jobs requiring sensitive data processing would not be batched with jobs that do not require nonsensitive data.

Figure 2:
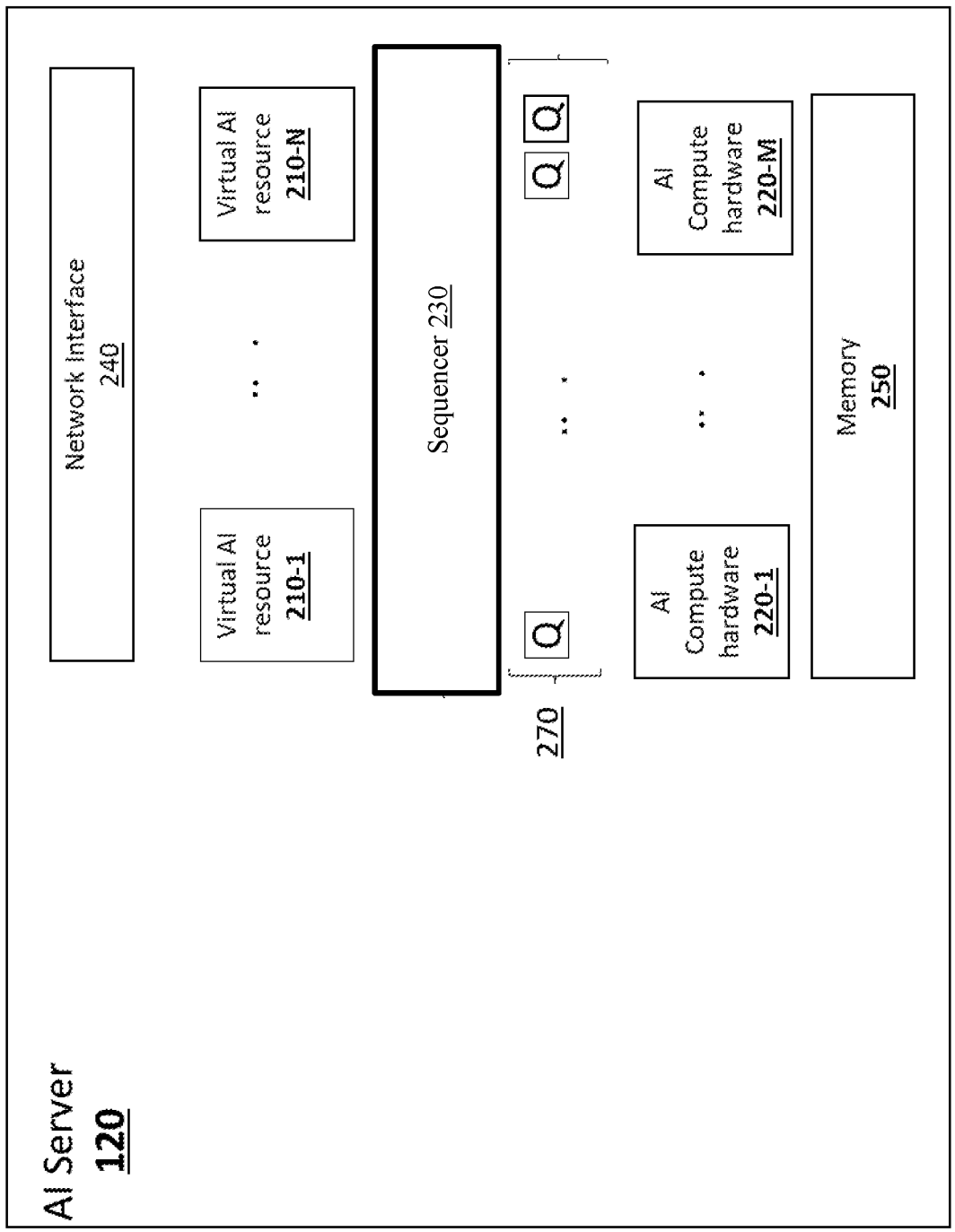
FIG. 2 is a schematic diagram of the AI server, designed according to an embodiment.

FIG. 2 is a schematic diagram of the AI server 120, designed according to an embodiment. The AI server 120 includes at least one AI compute engine 220, a sequencer 230, a network interface 240, and a memory 250. In one configuration, an AI compute engine 220 may be exposed on a respective virtual AI resource instance 210.

The memory 250 may be volatile (e.g., random access memory, etc.), non-volatile (e.g., read-only memory, flash memory, etc.), or a combination thereof. In another configuration, the memory 250 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code).

An AI compute engine 220 is a dedicated hardware processor (or any other piece of electronic hardware) configured to perform a specific function, thus offloading the processing of an AI job from the application host CPU or the AI-server host CPU or embedded CPU. An AI compute engine 220 may include a neural network core processor, a GPU (graphics processing units), one or more DSP (digital signal processors) cores, an FPGA (Field Programmable Gate Array), one or more video/JPEG codec core processors, one or more CPU processor cores, a deep neural network (DNN) accelerator, and the like. It should be noted that the AI server 120 can support the acceleration of tasks that are not AI tasks.

The sequencer 230 is configured to control and manage the data flow of one or more AI compute engines 220. This allows efficient job scheduling that can form a hardware pipeline. Such pipeline partitions distribute and feed AI computational tasks (or jobs) into different computation elements in a sequence while providing the data for computational element readiness before execution. As such, the computational element has minimal idle time, if any. The AI computational tasks may be received from a remote application through the network. The AI server 120 further includes a plurality of queues (collectively labeled 270) managed by the sequencer 230 for different purposes, such as virtualization, QoS, load balancing, and batching of AI jobs.

In an embodiment, the sequencer 230 is further configured to batch AI jobs. To this end, any new AI job received from the sequencer 230 is configured to create an instance of virtual AI resource(s) 210 and assign the same to a specific AI job. For example, a virtual AI resource 210-1 may be utilized to perform image processing, while a virtual AI resource 210-2 may be utilized for NLP. It should be noted that the creation of virtual AI resources 210 includes providing a separate isolated queuing path to each virtual AI resource 210, and separating scheduling resources at the sequencer 230. The virtualization of AI jobs is further disclosed in U.S. Non-Provisional patent application Ser. No. 17/643,353, titled "VIRTUALIZATION AND DISAGGREGATION OF ARTIFICIAL INTELLIGENCE RESOURCES" assigned to the common assignee and hereby incorporated by reference.

The sequencer 230 is further configured to create an AI job batch by aggregating jobs that may have been assigned to a certain AI virtual resource. The aggregation of AI jobs is performed by saving their respective data in a queue 270. The aggregation is performed until a service parameter (e.g., a maximum batch size) is met. In the latter embodiment, the sequencer 230 may start a timer upon storing the first AI job of a new batch and may check if the timer has reached a predefined threshold.

Once the batch is ready, the sequencer 230 is configured to schedule the execution of the batch on one of the compute engines 220. The AI compute engine 220, upon completing the processing of an AI job, returns the processing results to the sequencer 230, which, in return, provides the results (or responses) to the clients requesting the execution of the respective job. The data itself may be transferred directly to the final destination through a network, for example, using the RDMA protocol or a local bus. The transfer of data is performed through queues 270, managed by the sequencer 230. As noted above, as a batch includes AI jobs from multiple clients with the same computational graph or part of a computational graph fitting a joint execution, the processing results of each respective job are returned to the client requesting the execution of the job. The association of jobs in a batch to a client is saved in the list in the memory 250. This process is schematically demonstrated in FIG. 3.

It should be noted that the AI compute engines 220 push their processing results directly to queues 270 managed by the sequencer 230. The execution sequence includes a full sequence of operations required to execute an AI job, or part of it. The sequencer 230 is configured to manage all the operations in the execution sequence until receipt of all final results from an AI compute engine 220.

The sequencer 230 may further allocate different queues 270 to different virtual AI resources 210. An AI job may include multiple functions and may be processed in the AI compute engines 220 in multiple stages. Upon completion of each stage, the AI job is returned to the sequencer 230 for rescheduling of the following functions of the job. It should be noted that the data, control, or both, can flow from an accelerator to the sequencer 230, or can flow through a sideband mechanism.

The sequencer 230 is further configured to manage and schedule the AI Job's execution and provide a correct or efficient sequence to perform an AI job, meeting the predefined QoS and SLA parameters. To this end, as will be discussed in more detail below, the sequencer 230 is configured to manage a set of queues to hold received AI Jobs temporarily. Sequencer 230 is further configured to schedule the next queue to serve, build an execution sequence to the AI job, and push the job to the appropriate AI compute engines 220. These queues can hold jobs for different virtual resources, and by managing the jobs in separate queues, it allows for the isolation of the jobs of different virtual AI resources from each other. As a result, a congestion condition for one virtual resource will not starve the queue for a different virtual resource, even if scheduled on the same physical resource, or for security isolation consideration.

In an embodiment, the sequencer 230 is also configured to control load balancing between the virtual AI resources. The load balancing may be based on the current load of each virtual AI resource 210, round-robin, weighted round-robin, and the like. The load balancing is performed to support a predefined SLA. The sequencer 230 may be further configured to manage execution by the AI compute engines 220, while supporting functions including, without limitation, flow management, static or dynamic routing decisions, job multicasting, job batching, data manipulation, QoS of AI tasks (i.e., priority, starvation prevention, latency, and the like), control plane manipulation, partition sequencing, and execution of a computational graph framework (e.g., TVM, GLOW, and OpenVX), flow control, statistical computation, and the like, as well as any combination thereof.

The sequencer 230 and/or its various components may be realized as one or more hardware logic components and circuits. Illustrative hardware logic components that can be used may include FPGAs, ASICs, ASSPs, SOCs (system on chip systems), GPUs, CPUs, microcontrollers, DSPs, and the like, or any other hardware logic components that can perform calculations or other manipulations of information. Software executed by a hardware logic component shall be construed broadly to mean any type of instructions, whether referred to as software, firmware, middleware, microcode, hardware description language, or the like. Instructions may include code (e.g., in source code format, binary code format, executable code format, or any other suitable format of code).

The network interface 240 provides an interface between the AI servers and clients or other network-attached resources (e.g., storage servers) over the network fabric (shown in FIG. 1, above). According to the disclosed embodiments, the network interface 240 is configured to provide separate networking queues (not shown in FIG. 2) to the virtual AI resources 210. This allows for direction of traffic from a client requesting processing of an AI job to a virtual AI resource 210 handling the requested job and maintenance of isolation of the network/IO path between the virtual AI resources.

The network interface 240 may implement an AI over fabric (AIoF) protocol in an example embodiment. The AIoF protocol is a communication protocol designed to support AI service, AI model installations, and other AI operations. The AIoF protocol is configured for reduced latency associated with a transport protocol's overhead and the multiple data copies required to transfer data over the network and ensure end-to-end QoS for AI jobs. The AIoF protocol is configured using a shared memory over a network, in which the application can use its memory. At the same time, the hardware transparently copies the job data from the application's memory to memory 250 via the network. In other configurations, the network interface 240 provides an interface to a communication protocol, such as Transmission Control Protocol (TCP), remote direct memory access (RDMA), RDMA over converged Ethernet (RoCE), InfiniBand, and the like.

The AIoF protocol further allows separate virtual paths. Each virtual path is configured with a separate computing graph ID and a client ID. The traffic on such virtual paths is encrypted. The separation of virtual paths allows for the isolation between clients and AI hardware resources and between virtual AI resources and dedicated QoS and SLA per client. It should be noted that the network interface 240 can utilize other transport communication protocols not limited to the AIoF protocol.

The sequencer 230 is designed with a flexible hardware architecture designed to manage and control the AI compute engines 220 and virtual AI resources 210. The architecture of the sequencer 230 is further disclosed in U.S. patent application Ser. No. 17/018,628, incorporated herein by reference.

Figure 3:
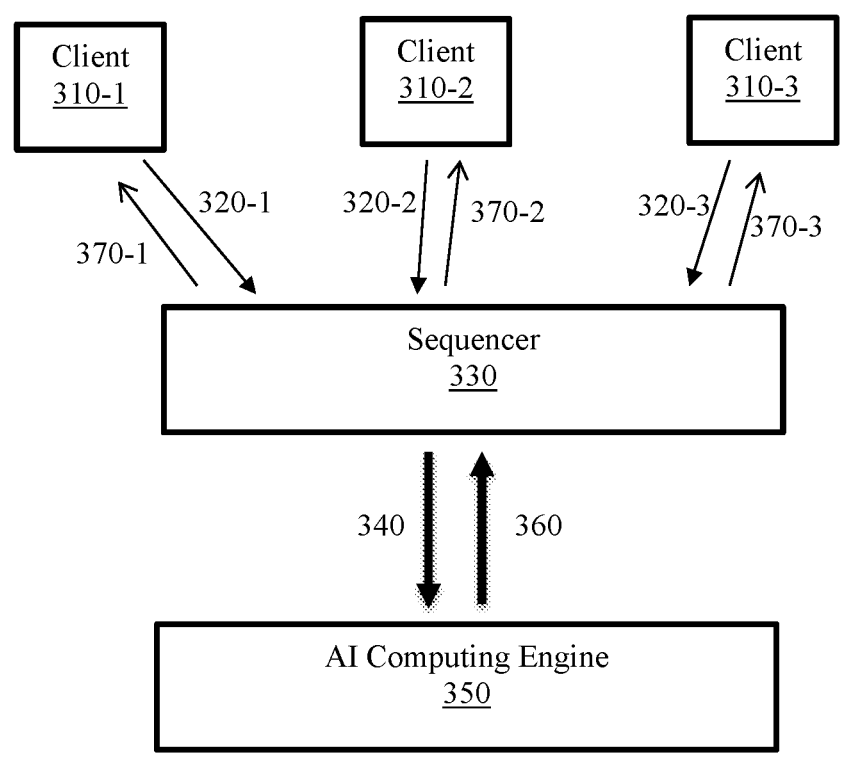
FIG. 3 is a schematic diagram illustrating the batching process according to an embodiment.

FIG. 3 is a schematic diagram illustrating the basic operation of a batching process, according to an embodiment. Example diagram 300 includes three (3) clients 310-1, 310-2, and 310-3, each issuing an AI job 320-1, 320-2, and 320-3, respectively. For the sake of simplicity, it is assumed that all jobs 320 are of the same type, such as, for example, requesting processing of the same graph. The AI jobs 320 are aggregated by a sequencer 330 into a single batch 340 and sent to an AI compute engine 350. The aggregation of AI jobs is performed to allow the optimized execution of the batch by the compute engine 350.

The processing results (a processed batch 360) are returned to sequencer 330, separating the processed batch 360 to the respective AI clients. In the example shown in FIG. 3, the processed batch 360 is separated to processed jobs (results) 370-1, 370-2, and 370-3, which are respectively returned to the clients 310-1, 310-2, and 310-3.

It should be noted that the example shown in FIG. 3 allows batching jobs to be executed by a single engine. However, disclosed embodiments may include creating a batch per compute engine or creating a batch including jobs executed on different compute engines.

Figure 4:
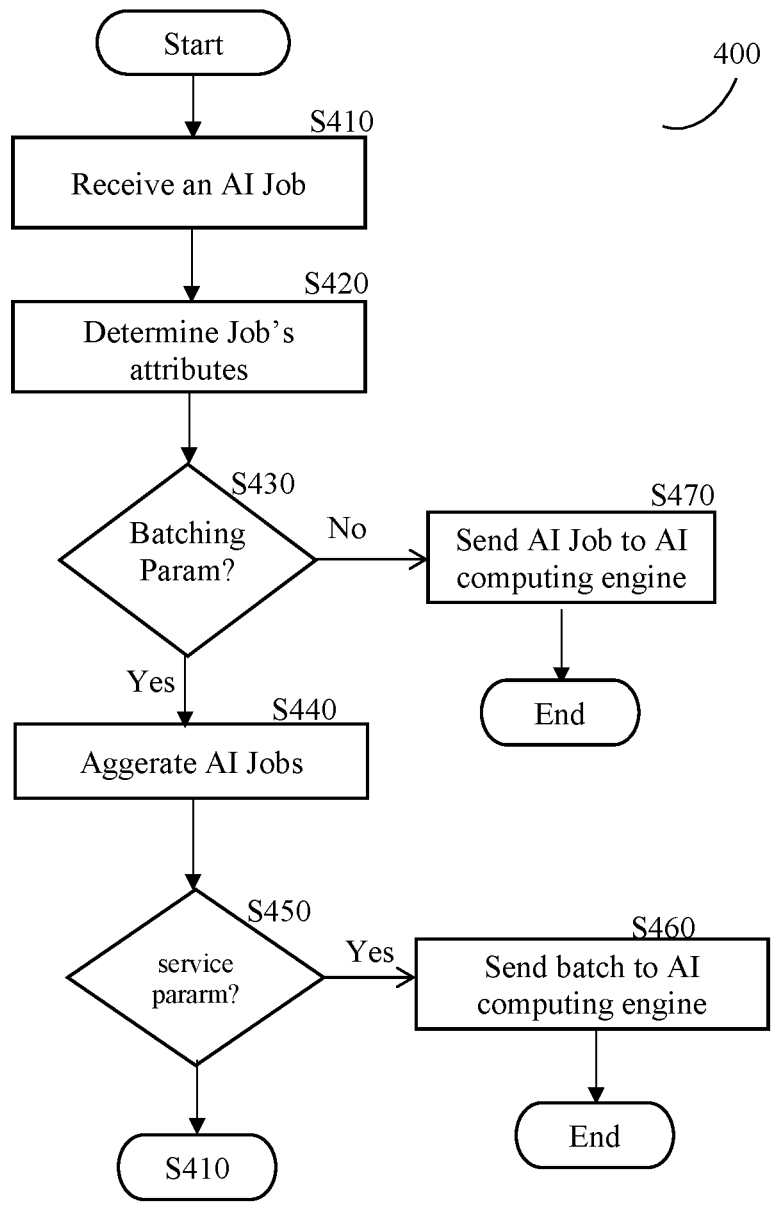
FIG. 4 is a flowchart illustrating the batching process according to an embodiment.

FIG. 4 is an example flowchart 400 illustrating the batching process according to an embodiment.

At S410, an AI job is received from a client. A client may be any application or service requesting AI processing, such as, for example, an AI model, a graph, and the like. At S420, the attributes of the received AI job are determined. Such attributes may include an AI job's type, size, latency (time to process the job), an AI model, a graph, and the like. The AI job type is determined to at least assign an AI compute engine that can process the task. The AI job type may be determined based on a job identifier (ID), a job description, or the requested processing, or can be determined together to all jobs alike from a similar computational graph or the same QoS or SLA level. This information is included in the AI jobs. The AI model and graph are programs that are required for the execution of the AI job.

At S430, it is determined if the received AI job meets at least one batching parameter; and if so, execution continues with S440, where the data of the received AI job is saved and aggregated, for example, in a queue. Otherwise, at S470, the received AI job is not batched and sent directedly to an AI compute engine for processing. A batching parameter may include one or any combination of: a type of an AI job, a compute engine type that can process the job, a QoS level or latency category, a security level, a job size (input size or output size).

The batching parameter may also include the transient conditions of the client, the transient conditions of the server, and other transient conditions. The batching parameter may include any other parameter that can be used, for instance, to optimize the performance of the client and/or of the server compute engines and other system engines (e.g., AIoF or AI Hypervisor) or the data transport and communication, internally at the server, or at the client, or between the server and client or all, or to optimized memory bandwidth, or 10 (input/output) operation at the server or the client. The selection of jobs to be batched may be dynamic. That is, selecting what jobs to batch and what is the batch (size, timeout, priority) are dynamically based on the batching parameters and what jobs are prohibited from batching. The batching parameter may be predetermined or configured by a user.

In an embodiment, S430 may include matching each of the at least one batching parameter to the AI job attributes to determine if the job can be efficiently batched. For example, S430 may include the determination of whether the received AI job can be executed by an AI compute engine which can support batch processing. Such determination is based on a batching parameter, such as a group of clients, a security association, a maximum batch size groups, and a data input length. If there is no such engine, then no batching operation is required.

The aggregation of AI jobs at S440 may include creating a new batch or adding the received AI job to an existing batch. At S450, it is checked if the batch created through the operation at S440 meets at least one predefined service parameter. As noted above, the service parameter may include a maximum latency for executing the batch, a maximum batch size, a QoS or SLA parameter, optimization of the server or client operation/computation, and the like. The maximum size refers to the data of the batch, and it is set to meet an optimized performance of the compute engine assigned to process the batch.

If S450 results in a Yes answer, at S460 the batch created through the operation of S440 is sent to the AI compute engine assigned to process the batch. The assignment of the AI compute engine is based on the type of AI jobs in the processed batch. In an embodiment, the data padding is performed to ensure that the batch is compatible with the AI compute engine. The padding may include adding data to input and/or output elements of the batch. If S450 results in a 'no' answer, execution returns to S410.

It should be noted that the compute engine processes the created. The processing results of the batch are received and separated to respective clients requesting the processing.

The embodiments disclosed herein can be implemented as hardware, firmware, software, or any combination thereof. The application program may be uploaded to, and executed by, a machine comprising any suitable architecture. Preferably, the machine is implemented on a computer platform having hardware such as one or more central processing units ("CPUs"), a memory, and input/output interfaces.

The computer platform may also include an operating system and microinstruction code. The various processes and functions described herein may be either part of the microinstruction code or part of the application program, or part of a hardware state machine, or any combination thereof, which may be executed by a CPU, whether such computer or processor is explicitly shown.

In addition, various other peripheral units may be connected to the computer platform, such as an additional network fabric, a storage unit, and the like. Furthermore, a non-transitory computer-readable medium is any computer-readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions.

What is claimed is:

1. A method for batching execution of artificial intelligence (AI) jobs, comprising:
    receiving, by an AI server, a plurality of AI jobs from a plurality of clients connected to an AI appliance over a network;
    for each AI job of the plurality of AI jobs:
        deriving at least one attribute of the received AI job;
        determining based on the at least one AI job attribute and at least one batching parameter if the received AI job is a candidate for batching;
        aggregating the received AI job into a created batch when the received AI job is determined to be a candidate for batching;
        continuing aggregating newly received AI jobs determined to be candidates for batching in the created batch until at least one service parameter is met; and
        sending the batch of AI jobs to a compute engine dedicated to execute the batch, thereby allowing batching of AI jobs received from a plurality of AI jobs.

2. The method of claim 1, further comprising:
    sending the received AI job to a compute engine other than the dedicated compute engine, wherein the AI job is determined not to be candidate for batching.

3. The method of claim 1, wherein the least one attribute is any one of: a type of an AI job type, a size of an AI job, a latency for processing an AI job, a required AI model, a required graph.

4. The method of claim 1, wherein the at least one batching parameter is any one of: a type of an AI job, a type of the dedicated compute engine, a latency level, a size of an AI job, and a transient condition of a client device sending the AI job.

5. The method of claim 1, wherein the at least one batching parameter includes a security level, thereby two or more AI jobs having different security levels will not be included in the same batch.

6. The method of claim 1, wherein determining if the received AI job is a candidate for batching further comprises:
    matching the at least one AI job attribute to the at least one batching parameter; and
    determining the AI job as a candidate for batching when there is a match between an AI job attribute of the at least one AI job attribute and a batching parameter of the at least one batching parameter.

7. The method of claim 1, wherein the service parameter is any one of: a maximum batch size, a quality of service (QoS) parameter, and a service-level agreement parameter.

8. The method of claim 1, wherein aggregating the received AI jobs further comprises:
    saving date of the received AI jobs in a queue.

9. The method of claim 1, further comprising:
    batching the AI job based on a type of the AI job.

10. The method of claim 8, wherein the dedicated compute engine is an accelerator designed to accelerate a specific type of an AI job, and wherein the compute engine is selected based on the AI job.

11. The method claim 1, further comprising:
    returning the processing results by the dedicated compute engine back to respective the client requesting execution of the AI job.

12. The method of claim 1, wherein each of the plurality of clients is an application server, and wherein the method is executed by an AI server configured to accelerate execution of AI jobs.

13. The method of claim 12, wherein the batching parameter is selected to at least optimize memory usage of the AI server.

14. A non-transitory computer readable medium having stored thereon instructions for causing a processing circuitry to execute a process, the process comprising:
    receiving, by an AI server, a plurality of AI jobs from a plurality of clients connected to an AI appliance over a network;
    for each AI job of the plurality of AI jobs:
        deriving at least one attribute of the received AI job;
        determining based on the at least one AI job attribute and at least one batching parameter if the received AI job is a candidate for batching;
        aggregating the received AI job into a created batch when the received AI job is determined to be a candidate for batching;
        continuing aggregating newly received AI jobs determined to be candidates for batching in the created batch until at least one service parameter is met; and
        sending the batch of AI jobs to a compute engine dedicated to execute the batch, thereby allowing batching of AI jobs received from a plurality of AI jobs.

15. A server for batching execution of artificial inelegance (AI) jobs, comprising:
    a processing circuitry; and
    a memory, the memory containing instructions that, when executed by the processing circuitry, configure the server to:
    receiving a plurality of AI jobs from a plurality of clients connected to an AI appliance over a network;
    for each AI job of the plurality of AI jobs:
        deriving at least one attribute of the received AI job;
        determining based on the at least one AI job attribute and at least one batching parameter if the received AI job is a candidate for batching;
        aggregating the received AI job into a created batch when the received AI job is determined to be a candidate for batching;
        continuing aggregating newly received AI jobs determined to be candidates for batching in the created batch until at least one service parameter is met; and
        sending the batch of AI jobs to a compute engine dedicated to execute the batch, thereby allowing batching of AI jobs received from a plurality of AI jobs.

16. The server of claim 15, wherein the server is further configured to:

send the received AI job to a compute engine other than the dedicated compute engine, wherein the AI job is determined not to be candidate for batching.

17. The server of claim 15, wherein the least one attribute is any one of: a type of an AI job type, a size of an AI job, a latency for processing an AI job, a required AI model, a required graph.

18. The server of claim 15, wherein the at least one batching parameter is any one of: a type of an AI job, a type of the dedicated compute engine, a latency level, a size of an AI job, and a transient condition of a client device sending the AI job.

19. The server of claim 15, wherein the at least one batching parameter includes a security level, thereby two or more AI jobs having different security levels will not be included in the same batch.

20. The server of claim 15, wherein the server is further configured to:
match the at least one AI job attribute to the at least one batching parameter; and
determine the AI job as a candidate for batching when there is a match between an AI job attribute of the at least one AI job attribute and a batching parameter of the at least one batching parameter.

21. The server of claim 15, wherein the service parameter is any one of: a maximum batch size, a quality of service (QoS) parameter, and a service-level agreement parameter.

22. The server of claim 15, wherein the server is further configured to:
save date of the received AI jobs in a queue.

23. The server of claim 15, wherein the server is further configured to:
batch the AI job based on a type of the AI job.

24. The server of claim 23, wherein the dedicated compute engine is an accelerator designed to accelerate a specific type of an AI job, and wherein the compute engine is selected based on the AI job.

25. The server of claim 15, wherein the server is further configured to:
return the processing results by the dedicated compute engine back to respective the client requesting execution of the AI job.

26. The server of claim 15, wherein each of the plurality of clients is an application server.

27. The server of claim 26, wherein the batching parameter is selected to at least optimize memory usage of the server.

* * * * *